Aug. 21, 1934.   H. C. KRAPF ET AL   1,971,109
VOLTAGE REGULATOR FOR AXLE GENERATORS
Filed July 7, 1932
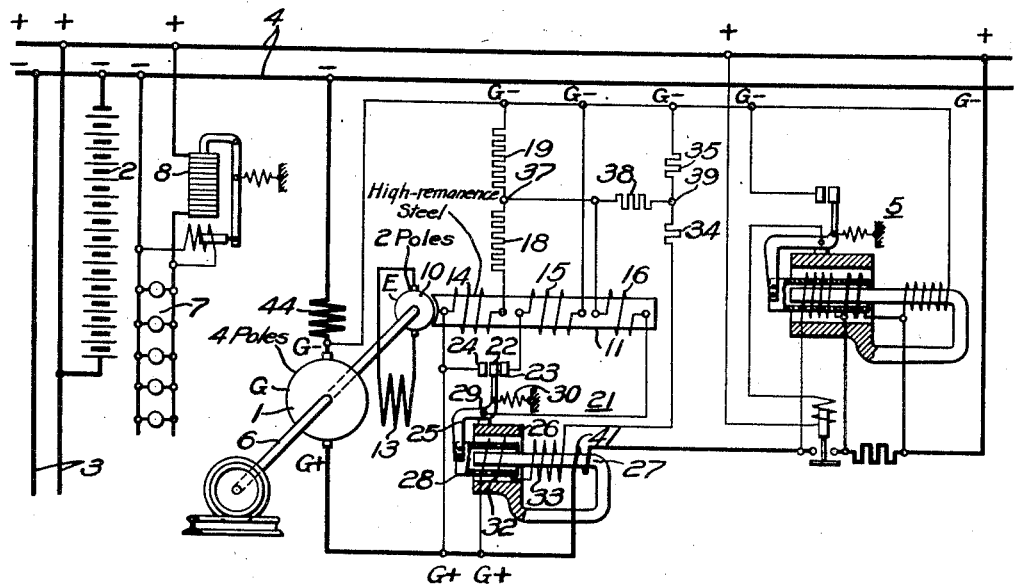
WITNESSES:
INVENTORS.
Herman C. Krapf and
Joe O. Sherrard.
BY
ATTORNEY Patented Aug. 21, 1934

1,971,109

UNITED STATES PATENT OFFICE 1,971,109

VOLTAGE-REGULATOR FOR AXLE-GENERATORS

Herman C. Krapf and Joe O. Sherrard, Wilkinsburg, Pa., assignors to Westinghouse Electric & Manufacturing Company, East Pittsburgh, Pa., a corporation of Pennsylvania Application July 7, 1932, Serial No. 621,135

19 Claims. (Cl. 171—313)

Our invention relates to voltage regulators and it has particular relation to such regulators adapted for use in connection with axle driven generators on railway cars, cooperating with a storage battery for supplying electric current for the car.

More particularly still, our invention relates to a voltage regulator for controlling the voltage of an axle driven generator, the field winding of which is energized by means of an especially designed exciter of unusually high remanence, for the purpose of preventing a reversal of the generator polarity when the direction of rotation is reversed, as described and claimed in an application of C. F. Jenkins, Serial No. 621,161, filed July 7, 1932, assigned to the Westinghouse Electric & Manufacturing Company.

An object of our invention is to produce a vibratory voltage regulator and regulator system in which the jarring of the regulator as a whole, as in railway service, will not produce any force tending to open or close the contacts of the regulator, and to produce a vibratory voltage regulator and regulator system which has an extremely great sensitivity and which maintains this sensitivity over an extraordinarily wide range of operation.

A further object of our invention is to provide a regulator system utilizing a special winding of the exciting field windings of the exciter. We prefer to utilize three exciting field windings instead of only one, although some of the results of our invention may be produced by utilizing only two of the three. The three windings referred to are two main exciting field windings, and one differential field winding which is necessitated by the high remanence of the exciter, and which is utilized, in connection with both of the main field windings, to assist the latter in producing as strong an excitation as possible at the lowest speeds of the generator, and to buck one of the main field windings at the highest speeds, the other main field winding being entirely disconnected under the latter circumstances.

A further object of our invention is to provide a voltage regulator element which utilizes, for its essential structure, aside from the specific coils and connections thereof, a structure which has been in successful use heretofore, as set forth in a patent of Walter Schaelchlin, No. 1,820,712, granted August 25, 1931 and assigned to the Westinghouse Electric & Manufacturing Company. This structure is further described in an article by said Schaelchlin, entitled "A sensitive roughneck" in the Electric Journal for May 1929, pages 216 to 224. In addition to the two serially connected shunt coils of the Schaelchlin regulator, one on the movable element and one on the stationary element of the regulator, we prefer to utilize also a series coil on the stationary or field element of the regulator, for strengthening the field thereof at very high generator speeds, thereby materially assisting in preventing excessive voltages at excessively high speeds, thus assisting in increasing the range of effectiveness of our regulator.

With the foregoing and other objects in view, our invention consists of the apparatus, systems and methods of operation hereinafter described and claimed and illustrated in the accompanying drawing, the single figure of which is a diagrammatic view of circuits and apparatus illustrating our invention in a preferred form of embodiment and in the particular railway-car system for which it was primarily designed.

Our invention is particularly designed for the electric supply system of an air-conditioned railway car utilizing an axle driven generator 1 and a storage battery 2, the generator being effective over a very wide range of speeds, as from car speeds of about 30 miles per hour to car speeds of about 100 miles per hour. The generator is of unprecedentedly large capacity, for an axle generator, and is so designed as to supply sufficient power for an air conditioning system for cooling and dehumidifying the air in the car, particularly during the summer time. A heavy, direct-current, feeder-bus 3 is provided for this purpose, this feeder-bus being a continuation of a main direct-current bus 4 which is permanently connected across the terminals of the storage battery 2.

The axle driven generator 1 is automatically connected to, and disconnected from, the direct-current bus 4, by means of any suitable reverse-current relay 5, preferably one which is physically independent of the voltage regulator about to be described, the particular reverse-current switch shown being the subject matter of an application of Donald W. Exner, Serial No. 621,-224, filed July 7, 1932, assigned to the Westinghouse Electric & Manufacturing Company.

The axle driven generator 1 is driven from an axle 6 of the railway car by any suitable drive-connection, such as that which is shown in detail and claimed in an application of W. A. Brecht, Serial No. 648,203, filed December 21, 1932, assigned to the Westinghouse Electric & Manufacturing Company.

The direct-current bus 4 is designed to supply lighting and other general-utility devices as well as the air conditioning apparatus which is connected across the bus-feeder 3. In order to compensate for the difference between the charging voltage and the discharging voltage of the battery 2, a separate lighting feeder 7 is utilized, in which the voltage is regulated by means of a carbon-pile regulator 8 in accordance with the usual practice.

On account of the unprecedentedly large size of the axle driven generator 1, it has been deemed impractical to make use of any of the polarity-changing switches which have heretofore been utilized in car-lighting systems, and we have utilized, instead, a specially designed exciter 10 having a magnetizable field member 11 of special iron or steel, particularly steel having more than the usual amount of carbon therein, and which is not annealed after the casting operation, so as to obtain the effect of some tempering of steel and a high remanence. In order to increase the high-remanence effect of the exciter, it is desirable also to utilize fewer poles in the exciter than in the generator so as to give a higher coercive force and a higher residual magnetism in the exciter than in the generator. Thus, we have indicated, by suitable legends in the drawing, that the exciter 10 has two poles and that the generator 1 has four poles.

The armature of the exciter 10 is connected directly across the field winding 13 of the axle driven generator 1.

The high-remanence exciter and the particular exciter-generator combination just described are claimed, per se, in the aforementioned application of C. F. Jenkins.

The exciter is provided with three field windings in the preferred form of embodiment of our invention. Two of these windings are main field windings 14 and 15. The third winding is a differential winding 16 which at times is connected to assist the two main field windings 14 and 15, and at other times is connected to buck the main field winding 14, the other main field winding 15 being under such circumstances disconnected. The first main field winding 14 has one terminal connected to the positive generator terminal G+, and its other terminal connected, through two serially connected resistors 18 and 19, to the negative generator terminal G—.

The connections of the other two field windings 15 and 16 of the exciter are controlled by means of our voltage regulator 21 which has a movable contact member 22 vibrating between two stationary contact members 23 and 24, respectively, the movable contact member being carried by a movable bell-crank lever 25 which constitutes a movable element of the regulator. The stationary or field element of the regulator consists of a tubular magnetizable portion 26 which is joined, at one end, to a core portion 27 which extends back through the tubular portion 26. The movable member 25 of the regulator carries an insulating tube 28 which is disposed within the tubular field portion 26 and around the corresponding part of the core member 27, without touching either one. The movable member 25 is pivoted at 29 to a lug on the stationary portion 26, and it is normally biased toward one position, with the contacts 22 and 23 in engagement, by means of a spring 30.

The regulator structure thus far described, that is, apart from the particular coils and connections thereof, is described in the Schaelchlin patent and article previously mentioned. The flux produced in the field member 26, 27, by means of the field exciting coils thereon as subsequently described, operates substantially uniformly across the gap between the tubular portion 26 and that part of the core 27 which lies therewithin, thus producing a uniform magnetic field which is effective in producing a uniform magnetic force acting on the movable member with an intensity which is not effected by the position of the movable member.

The main operating force of the regulator is produced by two shunt coils 32 and 33 connected in series with each other, the coil 32 being wound on the insulating tube 28 of the movable element, and lying within the aforementioned uniform field, and the coil 33 being wound on the portion of the core member 27 lying outside of the tubular frame portion 26, thus producing the aforementioned uniform field. The two coils 32 and 33 of the regulator are connected in series, with one terminal connected to the positive generator terminal G+, and the other terminal connected, through resistors 34 and 35, to the negative generator terminal G—.

The electromagnetic reactions between the movable coil 32 and the uniform air-gap field of the stationary coil 33 are such that the magnetic pull produced on the movable element 25 tends to open the contacts 22—23 and to close the contacts 22—24 against the pull of the biasing spring 30. The stationary contact 24 is connected to the positive generator terminal G+. The movable contact 22 is connected to one terminal of the differential field coil 16 of the exciter, the other terminal of this coil being connected to a point 37 between the two resistors 18 and 19 of the first field coil 14, and being also connected, through a resistor 38, to a point 39 between the resistors 34 and 35 of the regulator coil circuit. The other stationary contact 23 of the regulator is connected to one terminal of the second main field winding 15 of the exciter, the other terminal of which is connected to the negative terminal G— of the generator.

It will be observed that the two main windings 32 and 33 of the regulator are energized in response to the voltage of the axle driven generator 1. The flux of the winding 33 on the field member produces a magnetic force on the rotor member tending to pull the movable contact 22 away from the right-hand contact 23, but is unable to do so, against the pull of the spring 30, until the generator voltage equals about the voltage of the battery 2, or possibly a trifle less than the battery voltage. In one of our designs, for example, using a 32-volt battery, the regulator contact begins to vibrate at the contacts 22—23 when the generator voltage is 30, corresponding to a car speed of twenty-two miles per hour.

When the regulator contacts are sealed over, in their under-voltage position, with the spring pulling the movable contact 22 against the stationary contact 23, all three field coils 14, 15 and 16 of the exciter are energized, so that their magneto-motive forces all add together. Current enters the first main exciter field coil 14 from the positive generator terminal G+ and then passes out through the resistor 18 to the common point 37 of the network. From this point, the current divides, and part goes through a path consisting of the resistor 19, and part goes through a parallel path consisting of the differential field coil 16, and the second main field coil 15, returning to the negative terminal G— of the generator. The direction of current-flow in the three exciter field coils 14, 15 and 16 is such that the fluxes all add. In addition to the current-flow just traced, there will also be a current-flow from the point 39 in the regulator-coil circuit to the point 37 in the exciter field-coil circuit, this current first passing through the resistor 38 connecting these two points and then passing on through the exciter field coils 16 and 15, with part of it dividing and passing through the resistor 19 as above described.

As soon as the regulator contacts 22—23 are broken, the exciter field windings 16 and 15 are disconnected. The relatively low resistance of these windings is no longer in parallel to the resistance 19, so that the potential of the point 37 in the circuit of the exciter coil 14 is increased sufficiently to reverse the direction of the current-interchange between the said point 37 and the point 39 of the regulator-coil circuit, so that some of the current in the exciter field winding 14 divides at 37 then passes through the resistor 38 to the point 39, whence it passes, in common with the current in the regulator coils 32—33, through the resistor 35 to the negative generator terminal G—. The effect of this is to raise the potential of the point 39 in the circuit of the regulator coils 32 and 33, so that the current in these coils is reduced, thereby diminishing the magnetic force exerted by the regulator and permitting the spring 30 to quickly close the contacts 22—23 again, thereby obtaining both a vibratory action and an anti-hunting action in the regulator. It will be noted that the opening of the regulator contacts 22—23 not only cuts out two of the exciter field windings 16 and 15, but also reduces the current in the remaining field winding 14, thus producing the effect of reducing the exciter voltage.

The movable contact 22 of the regulator vibrates on the stationary contact 23, as above described, over a certain range of generator voltage,—in the case previously mentioned, between about thirty and thirty-six volts. Finally, as at about thirty-six volts, the pull exerted by the regulator with the movable contact 22 in its mid-position, out of contact with both stationary contacts 23 and 24, is just about sufficient to exactly balance the pull of the spring 30. At higher generator voltages, the movable contact 22 begins to vibrate against the other stationary contact 24.

When the regulator makes contact at 24—22, a strong current flows from the positive generator terminal G+, in the reverse direction through the differential exciter field winding 16 to the common point 37 of the exciter field-winding circuit, where it combines with the current flowing through the main exciter field winding 14 and the resistor 18, the combined current dividing, as before, the most part passing on through the resistor 38 to the point 39 of the regulator circuit, and thence on through the resistance 35 to the negative generator terminal G—, and a smaller part passing through the resistor 19. The increased current-flow through the resistance 35 produces a further increase in the potential of the point 39, so that the current in the regulator coils 32 and 33 is diminished, thereby permitting the regulator spring 30 to open the contacts 24—22 again, thus producing the necessary vibrating and anti-hunting effects.

The effect of the closure of the regulator contacts 24—22, on the excitation of the exciter, is twofold. In the first place, the low resistance of the differential field winding 16, being connected between the positive generator terminal G+ and the common point 37, increases the potential of this point and greatly reduces the strength of the current in the main exciter field winding 14. It is not possible, however, with the connections shown, to reduce the current in the main field winding 14 to zero. The high remanence of the magnetic circuit of the exciter, which was needed, at the moment of starting in order to ensure the proper polarity of the generator 1 with a reversal of the direction of rotation, now comes into effect to make the regulating problem extremely difficult, because even though the magnetomotive force of the main field winding were reduced to zero, the effect of the remanence, with its wide flat hysteresis loop, would be to cause the field flux to reduce only relatively slightly.

It has been necessary, in our device, therefore, to introduce a second regulating effect as a result of the closure of the regulator contacts 24—22, and this is done by exciting the differential field winding 16 in a direction to oppose the magnetomotive force of the main field winding 14, so as to overcome the effect of the high remanence of the magnetic field circuit and produce the necessary reduction in the magnetic flux therein.

Thus a regulating effect is produced which is effective over an extremely wide range of speeds, permitting the generator speed to increase to a speed three or four times as fast as the speed which it had when the first contact was made at 24—22, first bringing in the differential action of the differential field winding 16. At car speeds of around one hundred miles per hour, the regulator contacts seal over at 24—22, with the magnetomotive force of the main field winding 14 nearly overcome by the opposing magnetomotive force of the differential field coil 16, and the effective range of the regulator action is at an end.

The extremely wide range of operation which has just been described is not obtainable solely by means of the ordinary regulator coils 32 and 33 which are characteristic of the Schaelchlin regulator. It has been necessary, according to our present invention, to add, to the field member of the regulator, a series coil 41 which is excited by the current delivered by the generator to the direct-current bus 4, so as to add its field strength to that of the stationary shunt regulator winding 33. At the highest generator speeds, when the generator voltage tends to become too high, the amount of current delivered by the generator to the direct-current bus also increases and strengthens the field of the regulator, so that a smaller current is needed, in the moving coil 32, to oppose the pull of the spring 30, thus causing the regulator to operate at a lower voltage than would have been the case if the series winding 41 were not present.

An essential characteristic of our regulator is that it is very quick. With the series regulator coil 41 added to the regulator, and with the differential field winding 16 added to the exciter, the effect of the response of the regulator to a slight reduction in the terminal voltage of the generator, as upon the application of a load, is made very sensitive to slight voltage changes, very quick, and very severe in its effect on the exciter voltage. The high remanence of the magnetic field circuit of the exciter also comes into play to tend to retard the restoration of normal exciter excitation, after a movement of the regulator contacts, in the same manner that it opposes a reduction in the magnetic field in response to the initial movement of the regulator contacts. It has been necessary, for all of these causes, for us to utilize some other connection than the ordinary connection in which the exciter shunt field windings and the regulator shunt field windings are energized directly across the direct-current bus 4 when the generator 1 is supplying current to the bus. It has been necessary for us to interpose a steadying reactance between the voltage to which the shunt field windings of the exciter and the regulator respond and the bus voltage, so that the suddenness of the effects of connecting additional loads on to the bus will be softened by the effect of the reactance. We have found that a sufficient reactance for this purpose is provided by the commutating winding 44 which we utilize on the axle driven generator, and we have connected our exciter shunt field windings and our regulator shunt windings across the generator terminals on the inside of this series commutating winding 44 rather than on the outside thereof in accordance with the common practice.

While we have shown our invention in a single preferred form of embodiment, and in a single use or application, it will be obvious that various departures therefrom may be made within the spirit of our invention. It is desired, therefore, that the drawing and description be taken only as illustrative of our invention and that the appended claims be accorded the widest construction consistent with their language when read in the light of the prior art.

We claim as our invention:

1. An electrical regulating instrument comprising a tubular stationary frame-portion of magnetizable material, a stationary magnetizable core member having a portion extending substantially coaxially in said frame-portion so as to provide an annular gap therebetween, a magnetic field yoke member magnetically joining said tubular frame-portion and said coaxially extending core-portion, a field winding for sending a magnetic flux through said field yoke member and across said annular gap between said tubular frame-portion and said coaxially extending core-portion, and a movable member having contact make-and-break means, means for biasing said movable member toward one extreme position of its movement, and a movable-member winding carried by said movable member and so supported by said movable member as to move substantially axially in said annular gap when the movable member moves, both of said windings comprising a high-resistance shunt coil, and one of said windings comprising also a low-resistance series coil, means for electrically energizing the high-resistance shunt coil of one winding and the high-resistance shunt coil of the other winding from the same source to produce an electromagnetic force in opposition to said biasing means, an external circuit to be regulated, said source being varied in accordance with said external circuit, means responsive to a movement of said movable contact make-and-break means in response to said electromagnetic force to effect a regulating change in said external circuit and at the same time reduce the electrical energization of a winding of said regulating instrument so as to produce a vibratory movement of said movable contact make-and-break means, and means for electrically energizing the low-resistance series coil in series relation to the current in said source.

2. The invention as defined in claim 1, characterized by said series coil being a part of the field winding.

3. The invention as defined in claim 1, characterized by said contact make-and-break means comprising a movable contact member movable between two stationary contact members, and further characterized by said external circuit to be regulated being three exciting field windings of a dynamo-electric machine, the connections being such that when the movable contact member is in engagement with the stationary contact member toward which it is biased by said biasing means the three exciting field windings are all energized so as to be assisting each other; such that when the movable contact member is out of contact with both of the stationary contact members only one of said three exciting field windings is energized; and such that when the movable contact member is in engagement with the other stationary contact member said last-mentioned exciting field winding is opposed by another one of said three exciting field windings energized in the reversed direction.

4. The invention as defined in claim 1, characterized by said contact make-and-break means comprising a movable contact member movable between two stationary contact members, and further characterized by said external circuit to be regulated being a main exciting field winding and a differential exciting field winding of a dynamo-electric machine, the connections being such that when the movable contact member is in engagement with the stationary contact member toward which it is biased by said biasing means the main exciting field winding and the differential exciting field winding are energized so as to be assisting each other; such that when the movable contact member is out of contact with both of the stationary contact members the main exciting field winding is energized and the differential exciting field winding is deenergized; and such that when the movable contact member is in engagement with the other stationary contact member the main exciting field winding is energized in the same direction as previously and the differential exciting field winding is energized in the opposite direction so as to oppose the main exciting field winding.

5. The combination with a dynamo-electric machine having three exciting field windings, a source of voltage which is varied in accordance with the energization of said exciting field windings, a vibratory voltage-regulator having contact make-and-break means comprising a movable contact member movable between two stationary contact members, means for biasing said movable contact member toward one of said stationary contact members, winding-means responsive to said source for producing an electromagnetic force in opposition to said biasing means, the connections being such that when the movable contact member is in engagement with the stationary contact member toward which it is biased by said biasing means the three exciting field windings are all energized so as to be assisting each other; such that when the movable contact member is out of contact with both of the stationary contact members only one of said three exciting field windings is energized and the strength of response of said regulator winding-means is reduced; and such that when the movable contact member is in engagement with the other stationary contact member said last-mentioned exciting field winding is opposed by another one of said three exciting field windings energized in the reversed direction and the strength of response of said regulator winding means is still further reduced.

6. The combination with a dynamo-electric machine having a main exciting field winding and a differential exciting field winding, a source of voltage which is varied in accordance with the energization of said exciting field windings, a vibratory voltage-regulator having contact make-and-break means comprising a movable contact member movable between two stationary contact members, means for biasing said movable contact member toward one of said stationary contact members, winding-means responsive to said source for producing an electromagnetic force in opposition to said biasing means, the connections being such that when the movable contact member is in engagement with the stationary contact member toward which it is biased by said biasing means the main exciting field winding and the differential exciting field winding are energized so as to be assisting each other; such that when the movable contact member is out of contact with both of the stationary contact members the main exciting field winding is energized, the differential exciting field winding is deenergized and the strength of response of said regulator winding-means is reduced; and such that when the movable contact member is in engagement with the other stationary contact member the main exciting field winding is energized in the same direction as previously, the differential exciting field winding is energized in the opposite direction so as to oppose the main exciting field winding, and the strength of response of said regulator winding means is still further reduced.

7. The combination with a dynamo-electric machine having two main exciting field windings and a differential exciting field winding, a source of voltage which is varied in accordance with the energization of said exciting field winding, a vibratory voltage-regulator having contact make-and-break means comprising a movable contact member movable between two stationary contact members, means for biasing said movable contact member toward one of said stationary contact members, winding-means responsive to said source for producing an electromagnetic force in opposition to said biasing means, means for energizing one of the main exciting field windings from said source in series with a resistance, providing a main-winding junction-point between said main exciting field winding and said resistance, means for exciting the regulator winding-means from said source in series with a second resistance, providing a regulator-winding junction-point between said regulator winding-means and said second resistance, said two resistances being both connected to the same terminal of said source, a third resistance connected between said junction-points, one terminal of said differential exciting field winding being connected to said movable contact member, the other terminal of said differential exciting winding being connected to said main-winding junction-point, one terminal of the other main exciting field winding being connected to the stationary contact member toward which said biasing means biases said movable contact member, the other terminal of said last-mentioned main exciting field winding being connected to the same terminal of the source as the first and second resistances, the other stationary contact member being connected to the other terminal of said source, the directions of the exciting-winding connections being such that, when the movable regulator contact member is in its extreme biased position in contact with the first-mentioned stationary contact member, all three exciting field windings assist each other, so that, when the movable regulator contact member is in its opposite extreme position in contact with the second-mentioned stationary contact member, said differential exciting field winding opposes said first-mentioned main exciting field winding, the first and second resistances having such magnitudes that, when the movable regulator contact member is in its extreme biased position in contact with the first-mentioned stationary contact member, some of the regulator winding-means current is diverted into said first-mentioned resistance and into the differential exciting field winding, and the second-mentioned main exciting field winding, and such that, when the movable regulator contact member is in its central position, out of contact with both stationary contact members, some of the current in the first-mentioned main field exciting winding is diverted into said second resistance, and such that, when the movable regulator contact member is in its other extreme position in contact with the second-mentioned stationary contact member, a still larger current is diverted into said second resistance from both said first-mentioned main exciting field winding and said differential exciting field winding.

8. The invention as defined in claim 7, characterized by said regulator having a series coil assisting said regulator winding-means in response to the load-current supplied by said source.

9. The invention as defined in claim 7, characterized by said dynamo-electric means being an exciter and said source being the armature of a generator which is excited by said exciter, and a reactance device connected in series with said armature, outside of the exciting field winding connections and regulator winding-means connections defined as being connected across said source.

10. The invention as defined in claim 7, characterized by said dynamo-electric means being an exciter and said source being the armature of a generator which is excited by said exciter, said generator having a series winding connected in series with said armature, outside of the regulator winding-means connections defined as being connected across said source.

11. The invention as defined in claim 7, characterized by said dynamo-electric means being an excited and said source being the armature of a generator which is excited by said exciter, said generator having a series winding connected in series with said armature, outside of the regulator winding-means connections defined as being connected across said source, and said regulator having a series coil assisting said regulator winding-means in response to the load-current supplied by said source.

12. An electric supply system for a railway car, comprising a storage battery, a direct-current bus supplied thereby, an axle-driven dynamo-electric machine comprising direct-current generator having an armature, a magnetic field circuit having a predetermined residual magnetism, a main field winding and a series winding connected in series with said armature, a reverse-current switching means for effecting a connection of said armature and series winding across said direct-current bus to supply current to said bus when the generator voltage is sufficiently high and for interrupting said connection in time to prevent a material reverse current-flow from said bus upon a decrease in the speed of the generator, a second axle-driven dynamo-electric machine comprising an exciter having an armature connected to the main field winding of the generator and having an exciting field winding of its own, means for energizing said exciting field winding from the voltage generated in the generator armature, said exciter also having a magnetic field circuit having a residual magnetism which is sufficiently high, as compared to the generator residual magnetism, to insure the generator building up its armature voltage always in the same direction notwithstanding reversals in the direction of rotation, and means for varying the relative amounts of excitation flux furnished by said exciting field winding of the exciter from the generator armature voltage, said last-mentioned means comprising a voltage-regulator having regulator winding-means connected across said armature inside of said series winding.

13. An electric supply system for a railway car, comprising a storage battery, a direct-current bus supplied thereby, an axle-driven dynamo-electric machine comprising a direct-current generator having an armature, a magnetic field circuit having a predetermined residual magnetism, a main field winding and a series winding connected in series with said armature, a reverse-current switching means for effecting a connection of said armature and series winding across said direct-current bus to supply current to said bus when the generator voltage is sufficiently high and for interrupting said connection in time to prevent a material reverse current-flow from said bus upon a decrease in the speed of the generator, a second axle-driven dynamo-electric machine comprising an exciter having an armature connected to the main field winding of the generator and having an exciting field winding of its own, means for energizing said exciting field winding from the voltage generated in the generator armature, said exciter also having a magnetic field circuit having a residual magnetism which is sufficiently high, as compared to the generator residual magnetism, to insure the generator building up its armature voltage always in the same direction notwithstanding reversals in the direction of rotation, and means for varying the relative amounts of excitation flux furnished by said exciting field winding of the exciter from the generator armature voltage, said last-mentioned means comprising a voltage-regulator having regulator winding-means connected across said armature inside of said series winding, said voltage-regulator also having a series coil assisting said regulator winding-means in response to the load-current supplied by said generator.

14. An electric supply system for a railway car, comprising a storage battery, a direct-current bus supplied thereby, an axle-driven dynamo-electric machine comprising a direct-current generator having an armature, a magnetic field circuit having a predetermined residual magnetism and a generator field winding, a reverse-current switching means for effecting a connection of said armature across said direct-current bus to supply current to said bus when the generator voltage is sufficiently high and for interrupting said connection in time to prevent a material reverse current-flow from said bus upon a decrease in the speed of the generator, a second axle-driven dynamo-electric machine comprising an exciter having an armature connected to the main field winding of the generator and having an exciting field winding of its own, means for energizing said exciting field winding from the voltage generated in the generator armature, said exciter also having a magnetic field circuit having a residual magnetism which is sufficiently high, as compared to the generator residual magnetism, to insure the generator building up its armature voltage always in the same direction notwithstanding reversals in the direction of rotation, and means for varying the relative amounts of excitation flux furnished by said exciting field winding of the exciter from the generator armature voltage, said last-mentioned means comprising a voltage-regulator having regulator winding-means connected across said armature, said voltage-regulator also having a series coil assisting said regulator winding-means in response to the load-current supplied by said generator.

15. An electric supply system for a railway car, comprising a storage battery, a direct-current bus supplied thereby, an axle-driven dynamo-electric machine comprising a direct-current generator having an armature, a magnetic field circuit having a predetermined residual magnetism and a generator field winding, a reverse-current switching means for effecting a connection of said armature across said direct-current bus to supply current to said bus when the generator voltage is sufficiently high and for interrupting said connection in time to prevent a material reverse current-flow from said bus upon a decrease in the speed of the generator, a second axle-driven dynamo-electric machine comprising an exciter having an armature connected to the main field winding of the generator and having three exciting field windings, means for energizing said exciting field windings from the voltage generated in the generator armature, said exciter also having a magnetic field circuit having a residual magnetism which is sufficiently high, as compared to the generator residual magnetism, to insure the generator building up its armature voltage always in the same direction notwithstanding reversals in the direction of rotation, and means for varying the relative amounts of excitation flux furnished by said exciting field winding of the exciter from the generator armature voltage, said last-mentioned means comprising a vibratory voltage-regulator having contact make-and-break means comprising a movable contact member movable between two stationary contact members, means for biasing said movable contact member toward one of said stationary contact members, winding-means responsive to the generator voltage for producing an electromagnetic force in opposition to said biasing means, the connections being such that when the movable contact member is in engagement with the stationary contact member toward which it is biased by said biasing means the three exciting field windings are all energized so as to be assisting each other; such that when the movable contact member is out of contact with both of the stationary contact members only one of said three exciting field windings is energized and the strength of response of said regulator winding-means is reduced; and such that when the movable contact member is in engagement with the other stationary contact member said last-mentioned exciting field winding is opposed by another one of said three exciting field windings energized in the reversed direction and the strength of response of said regulator winding means is still further reduced.

16. An electric supply system for a railway car, comprising a storage battery, a direct-current bus supplied thereby, an axle-driven dynamo-electric machine comprising a direct-current generator having an armature, a magnetic field circuit having a predetermined residual magnetism and a generator field winding, a reverse-current switching means for effecting a connection of said armature across said direct-current bus to supply current to said bus when the generator voltage is sufficiently high and for interrupting said connection in time to prevent a material reverse current-flow from said bus upon a decrease in the speed of the generator, a second axle-driven dynamo-electric machine comprising an exciter having an armature connected to the main field winding of the generator and having a main exciting field winding and a differential exciting field winding, means for energizing said exciting field windings from the voltage generated in the generator armature, said exciter also having a magnetic field circuit having a residual magnetism which is sufficiently high, as compared to the generator residual magnetism, to insure the generator building up its armature voltage always in the same direction notwithstanding reversals in the direction of rotation, and means for varying the relative amounts of excitation flux furnished by said exciting field winding of the exciter from the generator armature voltage, said last-mentioned means comprising a vibratory voltage-regulator having contact make-and-break means comprising a movable contact member movable between two stationary contact members, means for biasing said movable contact member toward one of said stationary contact members, winding-means responsive to the generator voltage for producing an electromagnetic force in opposition to said biasing means, the connections being such that when the movable contact member is in engagement with the stationary contact member toward which it is biased by said biasing means the main exciting field winding and the differential exciting field winding are energized so as to be assisting each other; such that when the movable contact member is out of contact with both of the stationary contact members the main exciting field winding is energized, the differential exciting field winding is deenergized and the strength of response of said regulator winding-means is reduced; and such that when the movable contact member is in engagement with the other stationary contact member the main exciting field winding is energized in the same direction as previously, the differential exciting field winding is energized in the opposite direction so as to oppose the main exciting field winding, and the strength of response of said regulator winding means is still further reduced.

17. An electric supply system for a railway car, comprising a storage battery, a direct-current bus supplied thereby, an axle-driven dynamo-electric machine comprising a direct-current generator having an armature, a magnetic field circuit having a predetermined residual magnetism and a generator field winding, a reverse-current switching means for effecting a connection of said armature across said direct-current bus to supply current to said bus when the generator voltage is sufficiently high and for interrupting said connection in time to prevent a material reverse current-flow from said bus upon a decrease in the speed of the generator, a second axle-driven dynamo-electric machine comprising an exciter having an armature connected to the main field winding of the generator and having two main exciting field windings and a differential exciting field winding, said exciter also having a magnetic field circuit having a residual magnetism which is sufficiently high, as compared to the generator residual magnetism, to insure the generator building up its armature voltage always in the same direction notwithstanding reversals in the direction of rotation, a vibratory voltage-regulator having contact make-and-break means comprising a movable contact member movable between two stationary contact members, means for biasing said movable contact member toward one of said stationary contact members, winding-means responsive to the generator voltage for producing an electromagnetic force in opposition to said biasing means, means for energizing one of the main exciting field windings from said generator armature in series with a resistance, providing a main-winding junction-point between said main exciting field winding and said resistance, means for exciting the regulator winding-means from said generator armature in series with a second resistance, providing a regulator-winding junction-point between said regulator winding-means and said second resistance, said two resistances being both connected to the same terminal of said generator armature, a third resistance connected between said junction-points, one terminal of said differential exciting field winding being connected to said movable contact member, the other terminal of said differential exciting winding being connected to said main-winding junction-point, one terminal of the other main exciting field winding being connected to the stationary contact member toward which said biasing means biases said movable contact member, the other terminal of said last-mentioned main exciting field winding being connected to the same terminal of the generator armature as the first and second resistances, the other stationary contact member being connected to the other terminal of said general armature, the directions of the exciting-winding connections being such that, when the movable regulator contact member is in its extreme biased position in contact with the first-mentioned stationary contact member, all three exciting field windings assist each other, so that, when the movable regulator contact member is in its opposite extreme position in contact with the second-mentioned stationary contact member, said differential exciting field winding opposes said first-mentioned main exciting field winding, the first and second resistances having such magnitudes that, when the movable regulator contact member is in its extreme biased position in contact with the first-mentioned stationary contact member, some of the regulator winding-means current is diverted into said first-mentioned resistance and into the differential exciting field winding and the second-mentioned main exciting field winding, and such that, when the movable regulator contact member is in its central position, out of contact with both stationary contact members, some of the current in the first-mentioned main field exciting winding is diverted into said second resistance, and such that, when the movable regulator contact member is in its other extreme position in contact with the second-mentioned stationary contact member, a still larger current is diverted into said second resistance from both said first-mentioned main exciting field winding and said differential exciting field winding.

18. The invention as defined in claim 16, characterized by a reactance device connected in series with said generator armature, outside of the exciting field winding connections and regulator winding-means connections.

19. The invention as defined in claim 16, characterized by said generator having a series winding connected in series with the generator armature, outside of the exciting field winding connections of the exciter.

HERMAN C. KRAPF.
JOE O. SHERRARD.